United States Patent [19]
Corrigan

[11] 3,950,776
[45] Apr. 13, 1976

[54] SKI POSITION SIMULATOR

[76] Inventor: Malcolm Corrigan, P.O. Box 167, Southhampton, L.I., N.Y. 11968

[22] Filed: Mar. 26, 1975

[21] Appl. No.: 562,094

[52] U.S. Cl. .................................. 354/291; 272/9
[51] Int. Cl.² .................................. G03B 15/00
[58] Field of Search .............. 354/290, 291, 292; 40/106.51, 126 R; 35/29 R; 272/8 R, 8 D, 9, 11, 57 B, 8 N

[56] References Cited
UNITED STATES PATENTS

| | | | |
|---|---|---|---|
| 838,979 | 12/1906 | Goldin | 272/9 |
| 2,646,735 | 7/1953 | Zumbrunnen | 354/290 X |
| 3,455,550 | 7/1969 | Hall | 272/57 B |

FOREIGN PATENTS OR APPLICATIONS

| | | | |
|---|---|---|---|
| 474,274 | 6/1969 | Switzerland | 272/57 B |

Primary Examiner—Anton O. Oechsle
Assistant Examiner—Harry G. Strappello
Attorney, Agent, or Firm—Robert G. McMorrow

[57] ABSTRACT

A ski position simulator for use in photography and the like to enable a subject to assume and maintain position like that of a jumping skier has an elevated support. Prongs extended from the support are joined by cross plate, and skis are fixedly secured to the cross plate. A rest boom is pivotly connected to the cross plate, and carries a rest plate on which the subject leans to assume said position.

5 Claims, 7 Drawing Figures

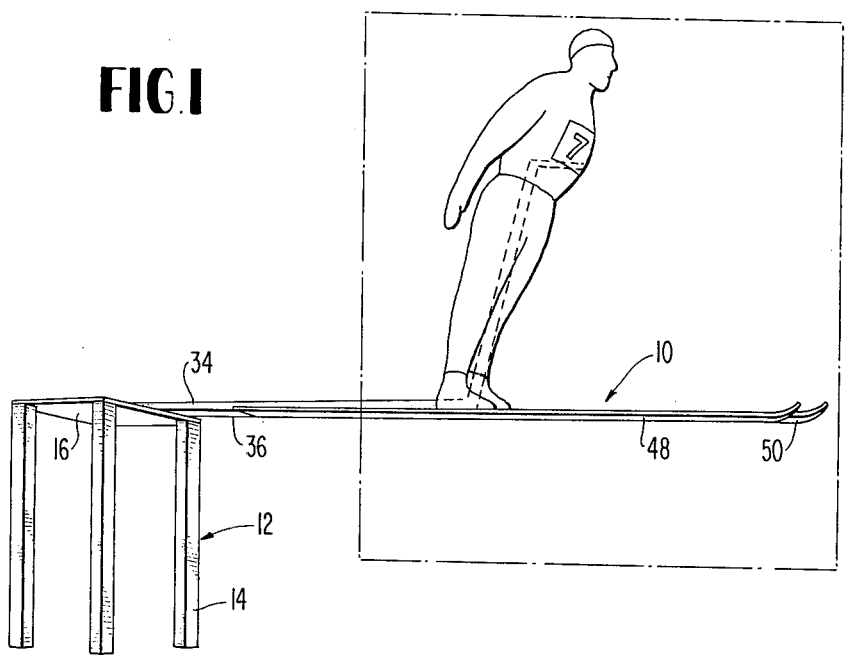
FIG.1
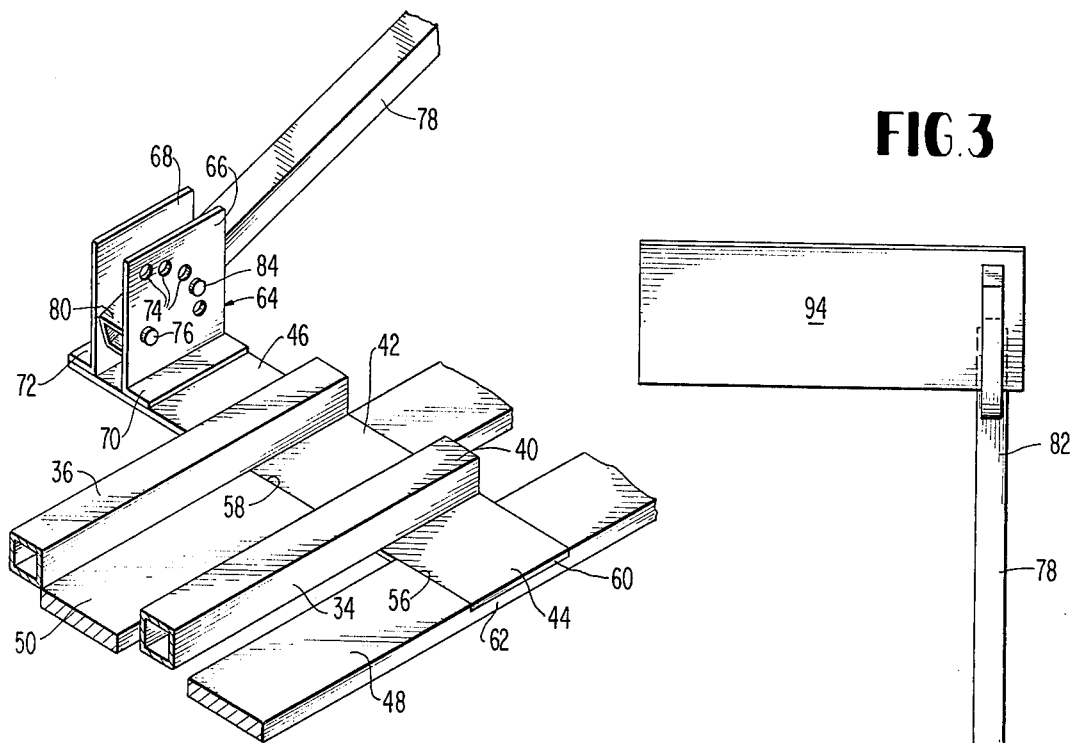
FIG.3
FIG.6
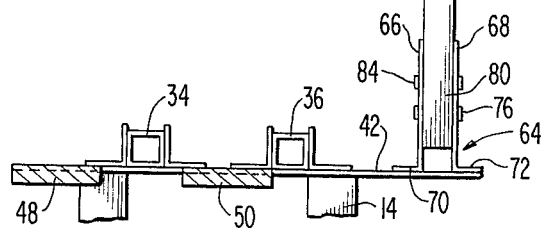

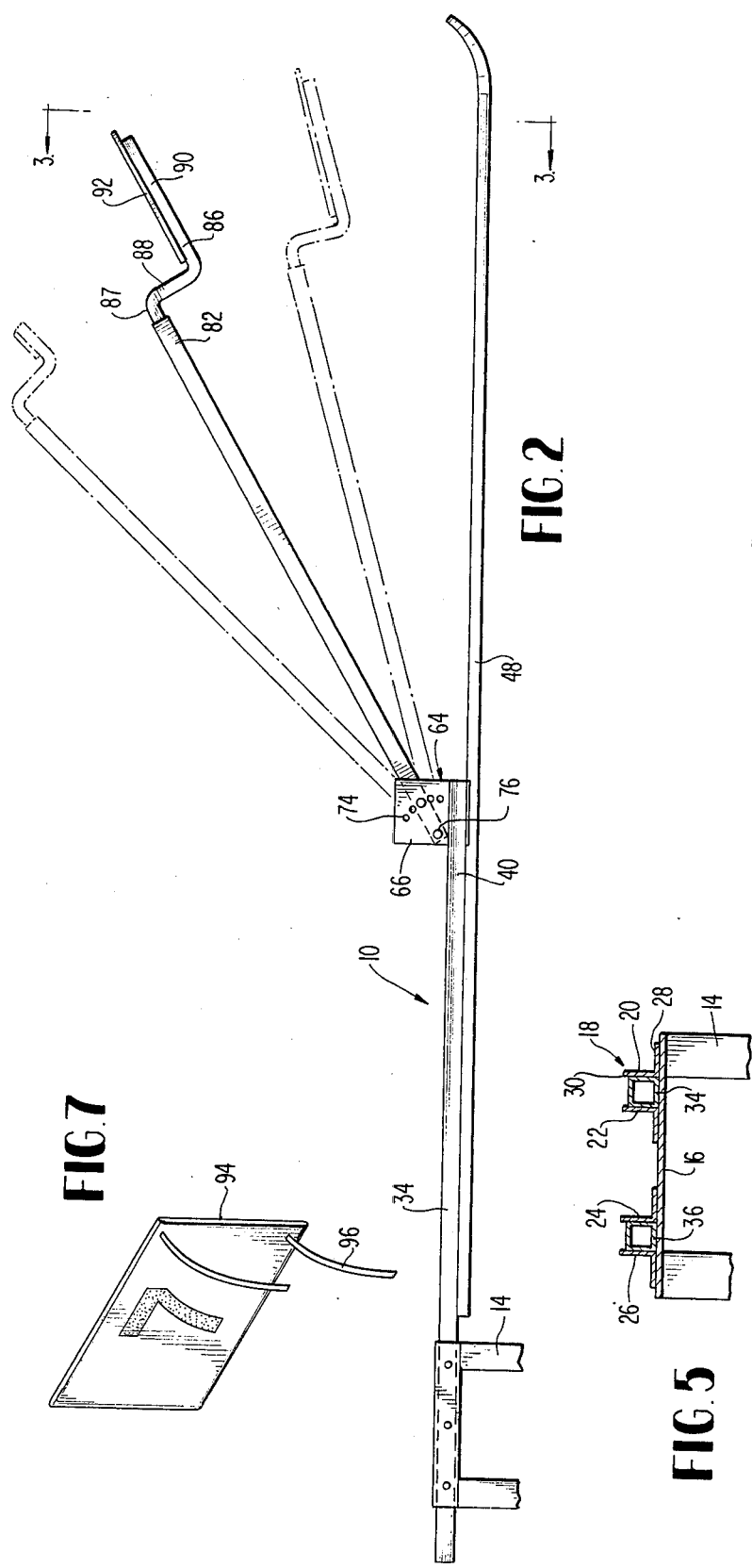
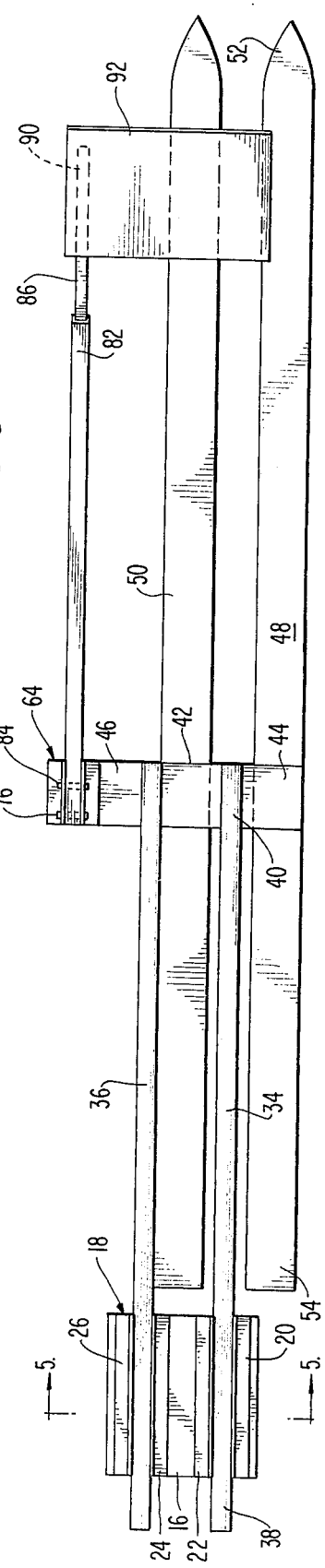

SKI POSITION SIMULATOR

BACKGROUND OF THE INVENTION

1. Field of the Invention

This invention pertains to a position simulator primarily for use in photography.

2. Statement of Prior Art

Devices for training in the sport of skiing have employed fixed skis and pivotal components to condition the skier. Such devices are representedly shown in the following U.S. patents:

| Patent No. | Patentee | Issue Date |
|---|---|---|
| 2,657,055 | Denham | Oct. 27, 1953 |
| 3,591,172 | Hude | July 6, 1971 |
| 3,707,283 | Cormier | Dec. 26, 1972 |
| 3,708,163 | Hynes | Jan. 2, 1973 |
| 3,731,919 | Schurch | May 8, 1973 |
| 3,831,935 | Hofle | August 27, 1974 |

Insofar as is known, the present device is the first to be directed to the principle objective hereof, e.g. a ski jump simulator to enable the subject to be photographed in ski jump position.

SUMMARY OF THE INVENTION

The invention provides a ski position simulator which enables a subject to assume and maintain for a long period of time a forward-leaning ski position like that employed in ski jumping. The purpose of this is principally that of positioning the subject to be photographed in such position. The device is intended for employment by photographers at ski resorts and the like. The unit includes angle adjustments permitting various poses.

The invention features a rest plate against which the subject leans and which provides adequate support. The rest plate is concealed by disguising it as a number patch of the type often worn by participants in ski jump competitions.

Additional objects and advantages of the invention will become apparent to those skilled in the art from a consideration of the following specification when read in conjunction with annexed drawings.

BRIEF DESCRIPTION OF THE DRAWINGS

FIG. 1 is a perspective view of the ski jump simulator hereof in use;

FIG. 2 is an enlarged side elevation (portions of the support being broken away) and showing alternate positions of the rest plate and boom;

FIG. 3 is a front view, partially in section from line 3—3 of FIG. 2, looking in the direction of the arrows;

FIG. 4 is a top plan view;

FIG. 5 is a sectional view on line 5—5 of FIG. 4 showing details;

FIG. 6 is a further enlarged perspective view of the cross plate and pivot bracket area; and FIG. 7 is a perspective view of the rest plate sleeve.

DESCRIPTION OF THE PREFERRED EMBODIMENT

Referring to the drawings in more detail the position simulator hereof is generally identified by reference numeral 10. The device 10 comprises a supporting stand assembly 12 having a series of ground support legs 14, and a flat top 16 carried on the legs. Fixedly secured to the top 16 are two bracket means 18 each composed of a pair of spaced apart angle members 20, 22 and 24, 26 (FIG. 5). Each of the angle members has a foot portion 28 which is permanently secured to the top 16, and a vertical leg portion 30.

A pair of elongated prong members 34, 36 are provided. Each of these has a proximal end 38 and a distal end 40, and the proximal ends of the prongs are fixedly secured in the respective bracket means between the vertical leg portions 30.

The proximal ends of the prongs are spanned by a cross plate 42 which is fixedly secured thereto. The plate has a first side area 44 and a second side area 46. It will be observed, particularly in FIG. 3, 4 and 6, that the second side area 46 projects outwardly a substantial distance.

Elongated skis 48 and 50 each have a leading end 52 and a trailing end 54. Intermediate the ends notches 56 and 58 are formed in the skis. These notches are dimensioned to accommodate the cross plate 42, and the connection is such that the skis are prominently fixed to the plate. The first side 44 of the cross plate has an end edge 60 which is substantially coincident with the adjacent side edge 62 of the ski 48. The plate is therefore not readily observable from that side of the device. However, the second side 46 of the plate, as indicated above, projects outwardly of the ski 50.

Mounted on the second side of the cross plate is a pivot bracket 64. The bracket comprises spaced apart vertical legs 66, 68 each having a perpendicular foot 70, 72 fixed to the cross plate. Each of the legs has a series of openings 74 formed therein and the openings are arranged in a curvilinear row on each plate. The rows of each plate are laterally aligned with one another. Each plate also has an offset hole to admit a cross axle 76.

Pivoted on the cross axle 76 between the legs 66, 68 is an elongated rest plate boom 78. The rest plate boom has a first end portion 80 occupying the pivot area, and has a second outward end 82. Also formed in the end 80 of the boom is a second hole which aligns with the respective openings 74 in the plates as the boom is pivoted. When the boom is at a selected angle relative to the skis, a removeable pin 84 is extendable therethrough to lock it in position.

An angle bar 86 extends from the end 82 of the boom and has a first section 87 connected thereto, a second section 88 which is generally perpendicular to the first section and extends downwardly, and a third support section 90 generally paralell in extent to the boom. Fixedly mounted on the third section is an enlarged, substantially retangular rest plate 92. The plate is connected to the section 90 adjacent one end thereof, and the major extent of the plate projects over the skis (FIGS. 3 and 4).

As shown in FIG. 1 the subject to be photographed assumes a stance on the skis and leans forward to rest his chest against the plate. The photo frame area is shown by the outline in FIG. 1, and from this viewing angle, the boom and other support components are sufficiently obscured to give the visual effect in the photoframe area of a jumping skier. The plate is disguised as the numeral patch of a ski competitor, preferably by covering it with a fabric sleeve 94 (FIG. 7) The sleeve has tie cords 96 for ease of application.

I claim:

1. A ski position simulator comprising:

a supporting stand having a series of legs and a top carried by the legs;

a pair of spaced apart horizontal prong members each having proximal and distal ends, and extending outwardly from the top;

bracket means securing the prong members on the top, said bracket means each comprising a pair of spaced apart angle members having foot portions fixedly secured to the top and having vertically projecting leg portions;

the proximal ends of the prong members being fixedly positioned between the vertically projecting leg portions of the bracket means;

a cross plate fixedly secured to the distal ends of the prong ends, the cross plate having a first side and a second side;

a pair of elongated skis, each having leading and trailing end portions, and having intermediate notches formed therein;

the cross plate occupying the notches in said skis and being fixed thereto;

the first side of the cross plate being substantially coincident with one of said skis, and the second side of the cross plate projecting outwardly of the other of said skis;

a pivot bracket on the second side of the cross plate comprising upstanding spaced apart legs each having a perpendicular foot fixed to the cross plate;

the legs each having a series of openings formed therein in curvalinear rows, and being laterally aligned;

an elongated rest plate boom having a first end pivotally mounted on an axle extended between the legs, and having a second end;

the boom having a further hole therein alignable selectively with the openings of the curvalinear rows, and a removeable pin insertable into the openings and hole to maintain the boom at a selected angle relative to the skis;

an angle bar on the second end of the boom;

a rest plate extended from the angle bar; and a removeable cover simulating ski indicia over said rest plate.

2. A ski position simulator comprising:

a supporting stand having an elevated top;

at least one prong member projecting forwardly from the elevated top of the supporting stand;

a cross plate fixedly secured to the prong members;

a pair of skis secured at midlength locations to the cross plate;

a rest plate boom adjustably pivotedly mounted on said cross plate and lockable at angles simulative of the position of a skier doing a ski jump; and a rest plate on said boom.

3. The invention of claim 2, and;

the rest plate carrying simulated ski indicia thereon.

4. The invention of claim 2, wherein:

at least two prong members are provided.

5. The invention of claim 2, wherein:

the skis have midlength notches therein; and the cross plate is fixedly secured in said notches.

* * * * *